US007003374B2

(12) United States Patent
Olin et al.

(10) Patent No.: US 7,003,374 B2
(45) Date of Patent: Feb. 21, 2006

(54) AIRCRAFT CARGO LOADING LOGISTICS SYSTEM USING MACHINE READABLE IDENTIFIERS

(75) Inventors: Craig J. Olin, Jamestown, ND (US); Blake A. Reed, Jamestown, ND (US); Corey M. Larson, Jamestown, ND (US); Marius Sterk, Collierville, TN (US)

(73) Assignees: Goodrich Corporation, Charlotte, NC (US); Federal Express Corporation, Memphis, TN (US)

( * ) Notice: Subject to any disclaimer, the term of this patent is extended or adjusted under 35 U.S.C. 154(b) by 6 days.

(21) Appl. No.: 10/894,034

(22) Filed: Jul. 20, 2004

(65) Prior Publication Data

US 2005/0246057 A1 Nov. 3, 2005

Related U.S. Application Data

(60) Provisional application No. 60/565,871, filed on Apr. 28, 2004.

(51) Int. Cl.
*G06F 7/00* (2006.01)
(52) U.S. Cl. .................... 700/213; 244/118.1; 410/77
(58) Field of Classification Search ................ 700/213; 244/118.1–118.6, 119, 122; 410/77, 78
See application file for complete search history.

(56) References Cited

U.S. PATENT DOCUMENTS

| | | | |
|---|---|---|---|
| 6,002,344 A | 12/1999 | Bandy et al. | |
| 6,520,472 B1 * | 2/2003 | Manich et al. | 248/351 |
| 6,695,555 B1 * | 2/2004 | Eilenstein et al. | 410/92 |
| 6,825,766 B1 | 11/2004 | Hewitt et al. | |
| 6,842,121 B1 | 1/2005 | Tuttle | |
| 6,867,702 B1 | 3/2005 | Huber et al. | |
| 6,883,710 B1 | 4/2005 | Chung | |
| 2002/0089434 A1 | 7/2002 | Ghazarian | |
| 2002/0134835 A1 | 9/2002 | Kennedy | |
| 2003/0117268 A1 | 6/2003 | Hewitt et al. | |
| 2003/0189094 A1 | 10/2003 | Trabitz | |
| 2004/0069850 A1 | 4/2004 | De Wilde | |
| 2004/0098272 A1 | 5/2004 | Kapsis et al. | |
| 2004/0222888 A1 | 11/2004 | Young et al. | |

OTHER PUBLICATIONS

"Boeing and Airbus complete Joint Industry Forums," Source: The STAT Trade Times, Nov. 20, 2001, http://www.tiaca.org/articles/2001/11/20/A5B14A6413424556B5D41B9752F4A5.asp, (date printed: Jun. 9, 2005).
"Overhaul & Maintenance," RFID: Knowledge Enabled Logistics, by Lee Ann Tegtmeier, Jun. 7, 2004; www.aviationnow.com/avnow/news/channel_om_story.jsp?is=news/om605RFID.xml (date printed: Jul. 12, 2004).
www.wherenet.com/products_main.html: WhereLAN, Location Sensor Locating Access Point; WhereTags; WheretagIII; WherePort; Visibility Server Software, 2003 WhereNet Corp., http://www.wherenet.com/products_main.html (date printed: Apr. 13, 2004).
"Accident Prevention Program, Weight and Balance," A.P.O., Weight and Balance, http://www.cyberair.com;tower/faa/app/p8740-5.html (date printed: Dec. 11, 2003).

\* cited by examiner

*Primary Examiner*—Khoi H. Tran
(74) *Attorney, Agent, or Firm*—Womble Carlyle

(57) ABSTRACT

A cargo loading logistics system for verifying cargo loaded on an aircraft receives a desired restraint configuration from a database and determines an actual restraint configuration on the aircraft by receiving data from a plurality of machine readable identifiers corresponding to a plurality of install points and data from a plurality of machine readable identifiers corresponding to a plurality of restraints. The cargo loading logistics system then compares the desired restraint configuration with the actual restraint configuration and determines if the aircraft is properly configured to be loaded for an upcoming flight.

21 Claims, 9 Drawing Sheets

| | 402 | 404 | 406 | 408 | 410 | 412 | 400 |
|---|---|---|---|---|---|---|---|
| 415 | Restraint Tag No. | Restraint Type | Part No. | Date of Manuf. | Manuf. | Comments | |
| | 211234161234 | XZ Single Latch 42 | L234 | 12/2002 | Goodrich | | |
| | 223785803745 | XZ Single Latch 19 | L238 | 08/1995 | Goodrich | | |
| | 228478303032 | XZ Single Latch 19 | L238A | 03/2001 | Goodrich | | |
| | 234092329783 | YZ Single Latch F | L245 | 07/1996 | Goodrich | | |
| | etc. | etc. | etc. | etc. | etc. | | |

*Fig. 4a* -Restraint Tag File

| | 422 | 424 | 426 | 428 | 430 | 420 |
|---|---|---|---|---|---|---|
| 425 | Install Point Tag No. | Compartment | X-Coordinate Location | Y-Coordinate Location | Comments | |
| | 123413412342 | Main Aft | A | 2 | | |
| | 135363423654 | Main Aft | B | 2-5 | | |
| | 175670937501 | Main Fwd | BC | 3-5 | | |
| | 182450843252 | Lower | C | 14 | | |
| | etc. | etc. | etc. | etc. | | |

*Fig. 4b* -Aircraft Install Tag File

| | 442 | 444 | 446 | 448 | 450 | 460 | 440 |
|---|---|---|---|---|---|---|---|
| 445 | Install Point Tag No. | Compartment | X-Coord Location | Y-Coord Location | Restraint Tag No. | Restraint Type | |
| | 123413412342 | Main Aft | A | 2 | 211234161234 | XZ Single Latch 42 | |
| | 135363423654 | Main Aft | B | 2-5 | 223785803745 | XZ Single Latch 19 | |
| | 175670937501 | Main Fwd | BC | 3-5 | 228478303032 | XZ Single Latch 19 | |
| | 182450843252 | Lower | C | 14 | 234092329783 | YZ Single Latch F | |
| | etc. | etc. | etc. | etc. | etc. | etc. | |

*Fig. 4c* -Aircraft Installed Restraint File

AIRCRAFT CARGO LOADING LOGISTICS SYSTEM USING MACHINE READABLE IDENTIFIERS

RELATED APPLICATIONS

The present application claims priority to U.S. Provisional Application No. 60/565,871, filed Apr. 28, 2004, whose contents are incorporated by reference. The present application has a specification substantially similar to that of U.S. patent application Ser. No. 10/833,341, filed Apr. 28, 2004.

FIELD OF THE INVENTION

The present invention is directed to a system for assisting cargo aircraft. More particularly, it is directed to a cargo loading system for cargo aircraft.

BACKGROUND INFORMATION

With the increasing emphasis on packages, mail, and other such items having to arrive at its location "overnight", more and more cargo is being shipped by aircraft 100 (See FIG. 1). While some aircraft are configured to transport cargo only, others are configured to transport both passengers and cargo.

Typically, the items being shipped are first loaded onto pallets, containers, or the like. In the airfreight industry, any one of these various categories of devices is referred to as a Unit Load Device 102 (ULD). Within each category, the ULDs come in various sizes, shapes and capacities and bear markings 104 that identify their type, maximum gross weight and tare weight, among other characteristics.

This initial task of placing the items to be shipped into a ULD may be performed at a location away from the immediate vicinity of the aircraft. In due course, however, the ULD is weighed, brought to the aircraft and sent up a ramp 106, scissors lift, or other means and then through a doorway 108. Once inside, the ULD is moved about the cargo compartment until it reaches its final position for the flight. As depicted in FIG. 2, on any given flight, a cargo aircraft 200 can carry a number of ULDs 202, of which aforementioned ULD 102 may be just one example, and so additional ULDs are brought onboard and placed in their proper positions. In certain aircraft, not all ULDs are in the same compartment, some being placed in the forward compartment 204 while others being placed in the aft compartment 206. And, as seen in the forward compartment 204, even ULDs of the same type need not necessarily all be adjacent to one another. Also, in many aircraft, ULDs may be placed on different vertical levels, or decks.

To facilitate moving around the ULD within the cargo compartment, the floor of the cargo compartment is provided with a number of structures with raised surfaces. These structures may take the form of parallel roller tracks arranged longitudinally along the length of the cargo floor, ball panel units, and the like. The bottom surface of the ULD rides on the raised surfaces provided by the rollers and balls of these structures, as it is moved within the compartment.

Once moved to its final position, further movement of the ULD is prevented for duration of the flight. This is done to ensure that the ULD will not move about when the aircraft is subjected to rough air, vibrations, acceleration, deceleration, and rough landings. To prevent movement of the ULD in flight, the floor and side walls of the cargo compartment may be provided with restraints that serve to keep the ULD stationary.

One example of such a restraint is a latch that is removably fixed to the floor and selectively adjustable between a deployed position and a retracted position. In the deployed position, an engaging member of the latch is erect and rises above the upper surface of the rollers, whereby it can confine movement of the ULD. In the retracted position, the engaging member is recessed, below the upper surface of the rollers so that the ULD can pass over it. The latch itself may be moved between the deployed and retracted positions simply by stepping on it or pressing a switch. Such latches are known in the art, and come in different types and sizes. The latches are positioned at predetermined "install points" on the cargo floor, the install points simply being defined as locations where there are holes, cutouts or other fixtures suitable for installing a latch. One example of such an install point may be between the rails of a roller track, another may be along a side rail on a wall of the cargo compartment.

A cargo floor may be provided with several hundred install points. However, not all install points are populated with restraints, due to the weight and cost of the latter. For example, on a cargo floor having 800 install points, perhaps 300 or so of these might be fitted with restraints. Usually, the operator of the aircraft will consider the types of ULDs they are likely to use, along with the likely load configurations, i.e., the various permutations in which different numbers and types of ULDs would be placed, and install a number of restraints accordingly.

FIG. 2 depicts a sample restraint configuration chart 250 of a cargo floor. This chart has a numbered grid 252 to establish an X-Y frame of reference for identifying locations on the cargo floor. Various restraints are indicated by symbols 254 and legend 256 is provided to identify the type of restraint associated with each symbol.

Each ULD normally requires multiple restraints, and different types of ULDs require different numbers of restraints. Operational criteria for each ULD specify the required number of restraints to be used, and the locations of those restraints relative to the ULD for when the ULD is at its maximum gross weight. They also specify a reduced maximum gross weight for when one or more of the required number of restraints is missing. Thus, on a given flight, if one of several restraints to be used to secure a ULD is damaged or missing, that ULD may still be transported in the chosen position, but only if it meets the reduced maximum gross weight specification.

The number of ULDs, the types of ULDs to be carried, and the weight of each ULD can change from flight to flight. Great care must be taken when loading aircraft with cargo to assure that the weight and balance of the aircraft with the loaded cargo is acceptable. Aircraft performance and handling characteristics are affected by the gross weight and center of gravity limits. An overloaded or improperly balanced aircraft will require more power and greater fuel consumption to maintain flight, and the stability and controllability may be seriously affected. Lack of appreciation for the effects of weight and balance on the performance of aircraft, particularly in combination with such performance reducing factors as high density altitude, frost or ice on the wings, low engine power, severe or uncoordinated maneuvers, and emergency situations, can be a prime factor in aircraft accidents.

Before the ULDs are loaded, the load master, or other cognizant individual, develops a desired load configuration that takes into account the weight and balance criteria, and the number, types and weights of the ULDs. This desired load configuration indicates where, on the cargo floor, each of the ULDs to be loaded onto the aircraft, should be positioned. In its simplest form, then, the desired load configuration is simply a two-column list, the first column identifying each ULD and the second its corresponding desired position.

The loading crew tasked with loading the aircraft receives a print out of the desired load configuration. But before loading the ULDs onto the aircraft, a ground member must establish that restraints of the correct type are installed at the various install points. This is done to ensure that each ULD's operational requirements for being secured by restraints can be met. For this, the loading crew member, armed with the desired load configuration, and relying on his or her familiarity with various ULDs, restraints and cargo floor equipment and assisted by color-coded markings on the cargo floor designating install points and the like, performs a visual inspection, and determines whether operable restraints of the correct types are installed in the correct locations for each of the ULDs to be loaded onto the aircraft.

During the inspection process, the loading crew member may discover a missing, damaged, or inoperable restraint. In such case, he or she reports this to the load master or other cognizant individual, who then may check the ULD operational criteria to determine whether either a lighter weight ULD or a different type of ULD could be located in that position, instead of leaving the position unused. Sometimes, it may be possible to move a restraint from one install point where it will not be needed for the upcoming flight, to another install point having a missing or damaged restraint, so that the ULD restraints requirements will be satisfied.

SUMMARY OF THE INVENTION

In one aspect, the present invention is directed to a cargo loading logistics system and method for verifying that an aircraft cargo compartment is ready to receive cargo. A desired restraint configuration is obtained and this is compared to an actual restraint configuration, based on first information received from a plurality of machine readable identifiers associated with respective install points, and second information received from a plurality of machine readable identifiers associated with respective restraints.

The actual restraint configuration may be modified, based on the comparison. For example, it may be modified to satisfy the desired restraint configuration.

BRIEF DESCRIPTION OF THE DRAWINGS

FIG. 4a shows a restraint tag file.

FIG. 4b shows an aircraft's install point tag file.

FIG. 4c shows an aircraft's installed restraint file.

DETAILED DESCRIPTION

Figures 1A, 1B:
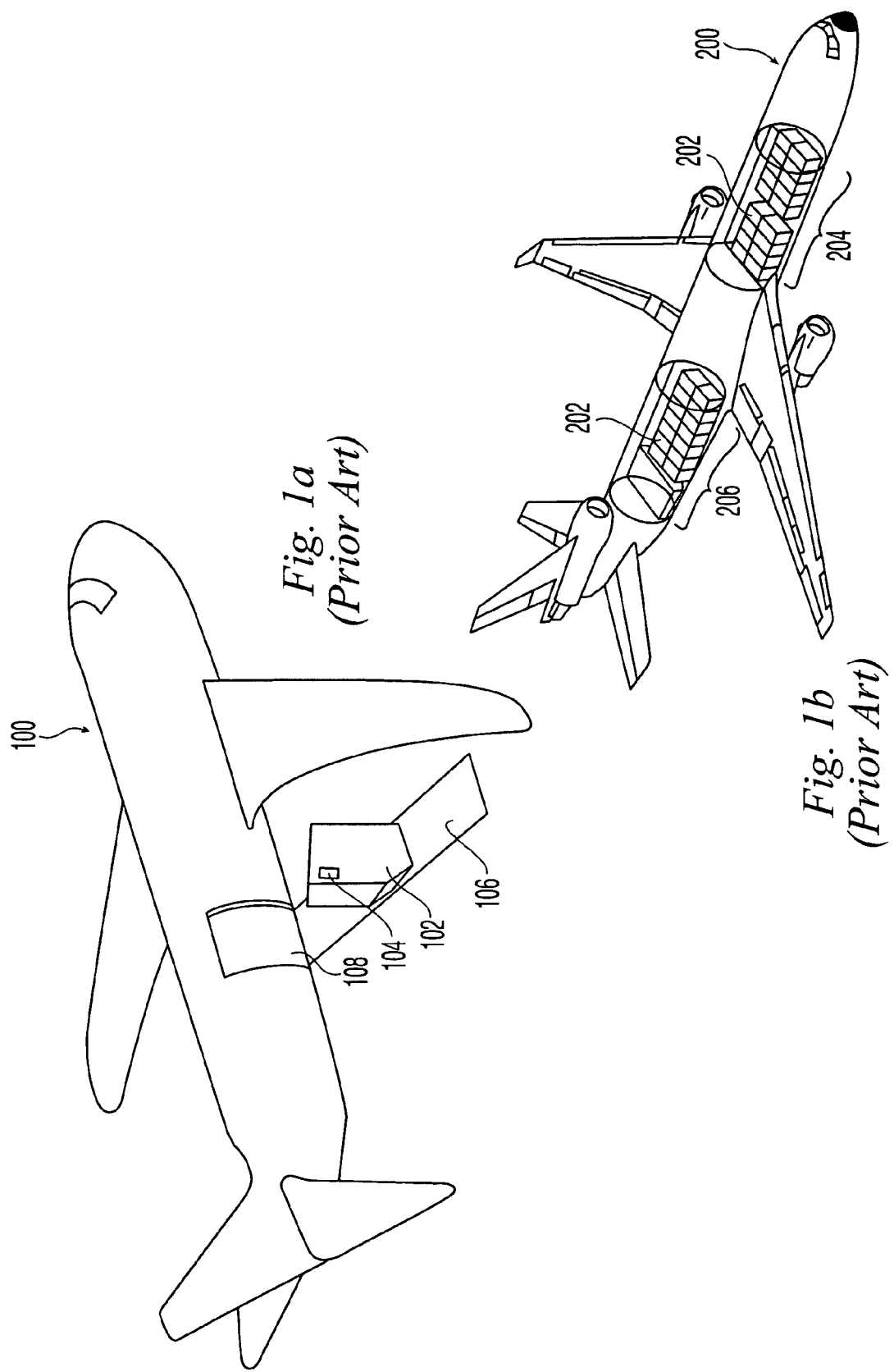
FIG. 1a shows a Unit Load Device being loaded onto an aircraft, in accordance with the prior art
FIG. 1b shows a cut-away view of an aircraft carrying multiple unit load devices.
Figure 2:
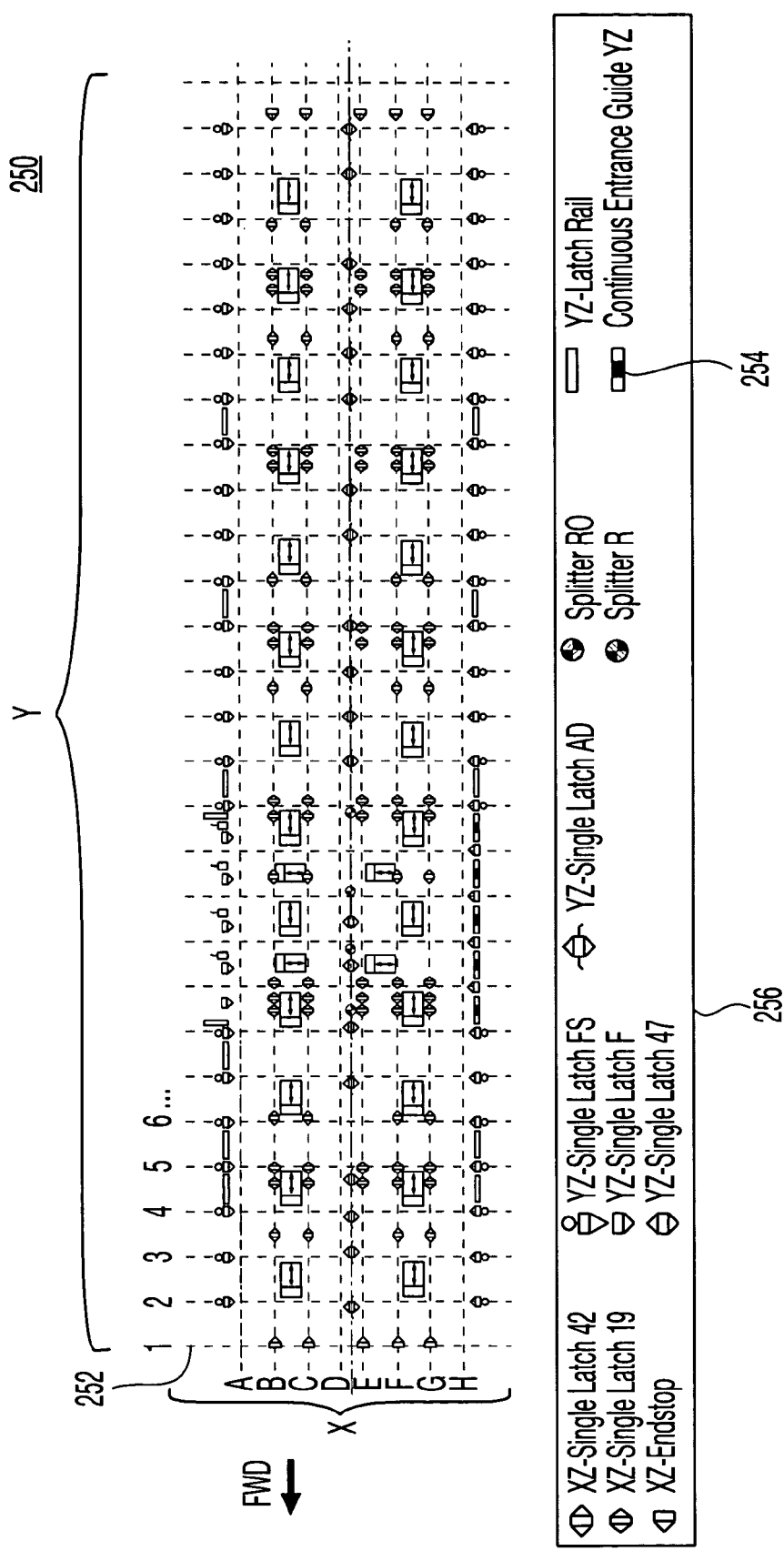
FIG. 2 shows a sample configuration sheet for an aircraft cargo compartment.
Figure 3A:
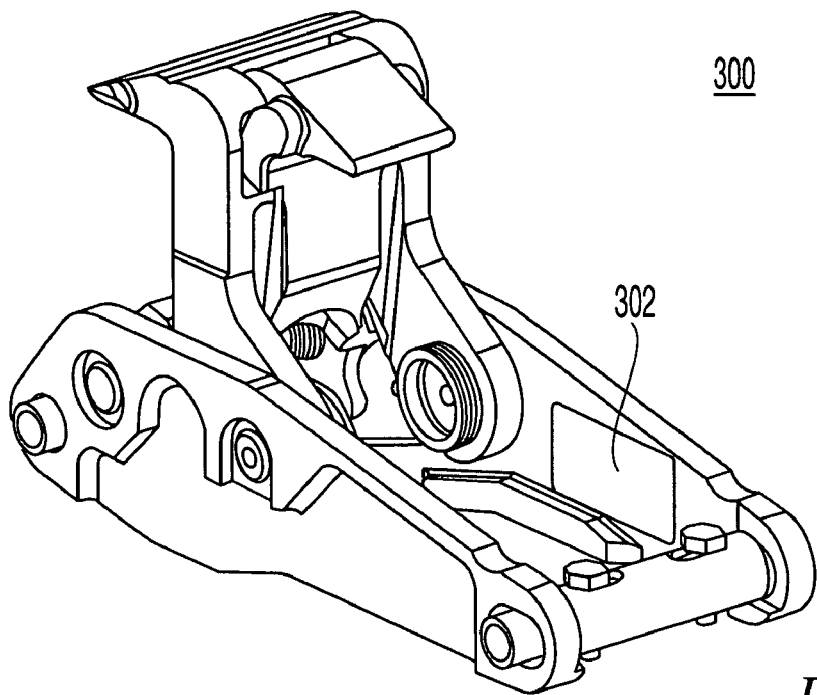
FIG. 3a shows a restraint bearing a tag in accordance with the present invention.

FIG. 3a shows a restraint 300, in this case, a latch of the type known to those skilled in the art, bearing a restraint tag 302. The tag 302 is a machine readable identifier, preferably in the form of a bar code tag or a radio frequency identification ("RFID") tag. However, the tag 302 can be any type of technology that can be read by a machine and helps identify the object to which it is affixed. While in a preferred embodiment, the tags are read by machine, it is possible for a tag to bear printed matter that a person can read and then transcribe, such as by typing onto a keyboard associated with computer or other device that can store the thus-transcribed tag information.

The restraint tag 302 may be affixed to the restraint 300 at any one of a number of different times, and by any one of a number of different entities. For example, it is possible that the restraint tag is affixed to a restraint by the manufacturer, during or soon after manufacture. In such case, all restraints, when initially shipped, bear such a restraint tag. As an alternative, the restraint tag may be affixed just before restraint is installed in a cargo compartment, and this can be done by such varied entities as the aircraft manufacturer, the restraint manufacturer, an aircraft maintenance & service organization, the aircraft owner or operator, or some other entity. In yet another alternative, the restraint tag is placed on a restraint that has previously been installed, such as when one wishes to retrofit a cargo compartment so as to benefit from the present invention.

Regardless of who affixes the restraint tag, upon affixing the restraint tag to a restraint, a data record for that restraint may be created. FIG. 4a illustrates a Restraint Tag File 400 comprising a number of data records, each associated with certain types of information associated with a restraint, that may be specified. A data record 415 may thus include the restraint tag number 402, (i.e., the tag number affixed to the restraint), an indication of the type of restraint 404, its part number 406, the date of manufacture 408, the manufacturer's name 410, and a comment field. Other information may also be retained in this file such as its load capacity, repair history, etc. Thus, by reading the restraint tag, one may quickly gain access to this information, assuming the file 400 is connected in some manner to the tag reader.

It is possible that all restraints made by all manufacturers, when tagged, are ultimately entered into a single database, and the associated information is subsequently accessible, in a read-only mode, to anyone with proper authorization. Alternatively, each aircraft owner or operator may maintain their own database of tagged restraints without regard to manufacturer, and a separate database may be created for each such aircraft owned or operated. Other arrangements are also possible to keep track of information about restraints. What is important is that each restraint tag number is linked to information about the nature of the restraint, e.g., the type 404 or part number 406, so that one need only read the restraint tag to determine the nature of the restraint.

Figure 3B:
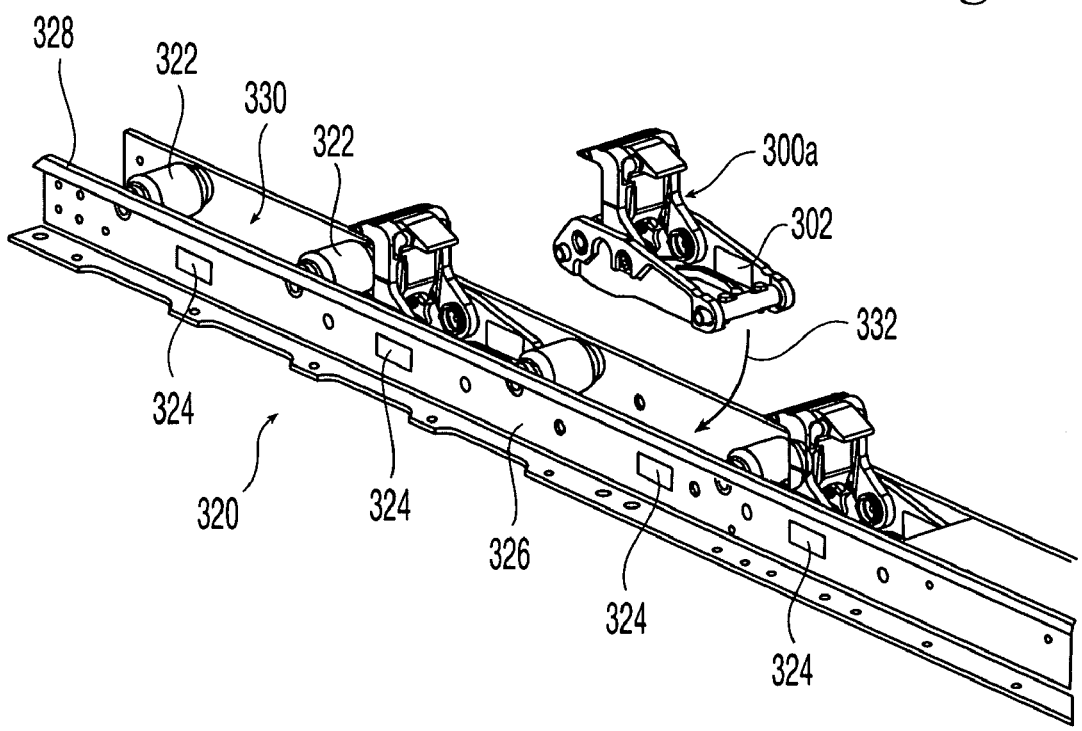
FIG. 3b shows a roller track having a tagged restraint positioned in tagged install points in accordance with the present invention.

FIG. 3b shows a roller track 320 of the sort used in an aircraft cargo floor. Roller track 320 has a plurality of spaced-apart rollers 322 positioned along a longitudinal direction thereof. Install point tags 324 are provided at spaced apart locations on the exterior wall 326 of a rail 328 of the roller track 320. These locations are adjacent to install points 330 at which a restraint 300a may be installed, as depicted by arrow 332.

It is understood that while FIG. 3b depicts only a roller track, install points (and thus, install point tags) may be found on a variety of tracks, ball panels, and other devices known to those skilled in the art on the floor of an aircraft cargo compartment. They may be also found on the side walls of the cargo compartment, as well. Regardless of where the install point tags are located, they preferably are of the same type as the restraint tags. That is, if one is, e.g., a bar code, so is the other. This allows one to use the same reader to read both tags, as discussed further below.

The install point tags 324 are applied at the various install points 330 when the roller track is itself installed on the aircraft cargo floor. In most instances, this happens when the aircraft is first being configured, although retrofitting is also possible. Furthermore, the install point tags may, but need not be, applied by any of the various entities that apply the restraint tags. Also, while it is preferable that each install point in the aircraft cargo area will have an install point tag associated with it, it would be acceptable for fewer than all install points to have tags. The untagged install points will receive tags, as needed, during the aircraft's service lifetime.

When the install point tags are applied, a data record is created for that tag. FIG. 4b illustrates an Aircraft Install Point Tag File 420 comprising a number of individual data records 425, each record associated with certain types of information associated with an Install Point. As seen in this embodiment, the information includes the install point tag number 422, the aircraft compartment 424 in which it is located, the X-coordinate 426 on the floor of the cargo compartment and the Y-coordinate 428 of the cargo compartment. A comment field 430 and perhaps even other fields may be provided to store other information about the install points.

In the file of FIG. 4b, an X-coordinate location and a Y-coordinate location are associated with each install point tag, thereby implying a two-dimensional cargo floor on which the various install points are situated, and at which a corresponding install point tag is affixed. It should be noted, however, that additional or different (e.g., "Z-coordinate") location fields may be provided to keep track of install point tags that are affixed to install points on the side walls of the compartment. In addition, in some aircraft where there is only a single cargo compartment, there may be no need to keep track of a 'compartment' field 424 at all.

Upon installing a tagged restraint 300 at a tagged install point, it is desirable to link the two for future cross-reference. In a preferred mode of operation, the install point tag is read first and the restraint tag is read immediately after during a 'registering' mode of a tag reader and its associated data capture device, as discussed further below. The effect of this is to link a particular install point tag (and thus the location) with a particular tagged restraint installed at that install point. Conceptually, this links together two tag numbers, and thus information associated with each, together. As a result, each restraint installed on the aircraft becomes associated with a particular install point, and thus a particular location.

FIG. 4c shows an Aircraft Installed Restraint File 440 comprising a record 445 for each two-pair which includes an install point tag number 442 and a restraint tag number 450. Each record may also identify the compartment 444, X-coordinate 446 and the Y-coordinate 448 of the install point tag within that compartment, as well as information about the restraint type 460. It is understood that this file 440 has one entry per installed restraint and so has no greater a number of entries (and typically fewer records) than the Aircraft Install Point Tag File 420. However, both files 420, 440 are unique for a particular aircraft.

When the foregoing linking process is performed when the aircraft cargo area is first being configured, this results in an original, or "baseline" configuration for the aircraft. This baseline configuration may, however, be updated, as necessary, in which case the information in file 440 is preferably updated, so that it is kept current.

In the foregoing discussion, reference has been made to discrete files 400, 420 & 440. It is understood that a single relational database may include all of the underlying information, from which a specific query may provide any subset of desired information corresponding to these files. Thus, for example, it is possible that files 420 or 440 do not exist as discrete files, but only as cross-sections of what is available from such a database. Furthermore, in such a database, the install point tag numbers serve as a first type of identifying information that is associated with a location of each of a first plurality of install points in the cargo compartments, while the restraint tag numbers serve as a second type of identifying information corresponding to a restraint type or even unique restraint units. And when the first and second types of identifying information are associated with each other, such as through tag reading operations, the restraints then become associated with the locations.

Furthermore, in the discussion above, the restraints are tagged with tags bearing unique identification numbers. This, however, is not a requirement of the invention. Due to the fact that there is a finite number, e.g., less than 100 or so, more or less standardized types of restraints, one may dispense with a uniquely numbered tag for each restraint, and instead use a bar code tag or RFID tag that directly corresponds to the part number or description of the restraint. In such case, individual restraints of the same type are not distinguishable from one another and so the "Restraint Tag No." fields 402, 450 in the FIGS. 4a, 4b, respectively, are redundant with the "Restraint Type" fields 404, 460.

Figure 5:
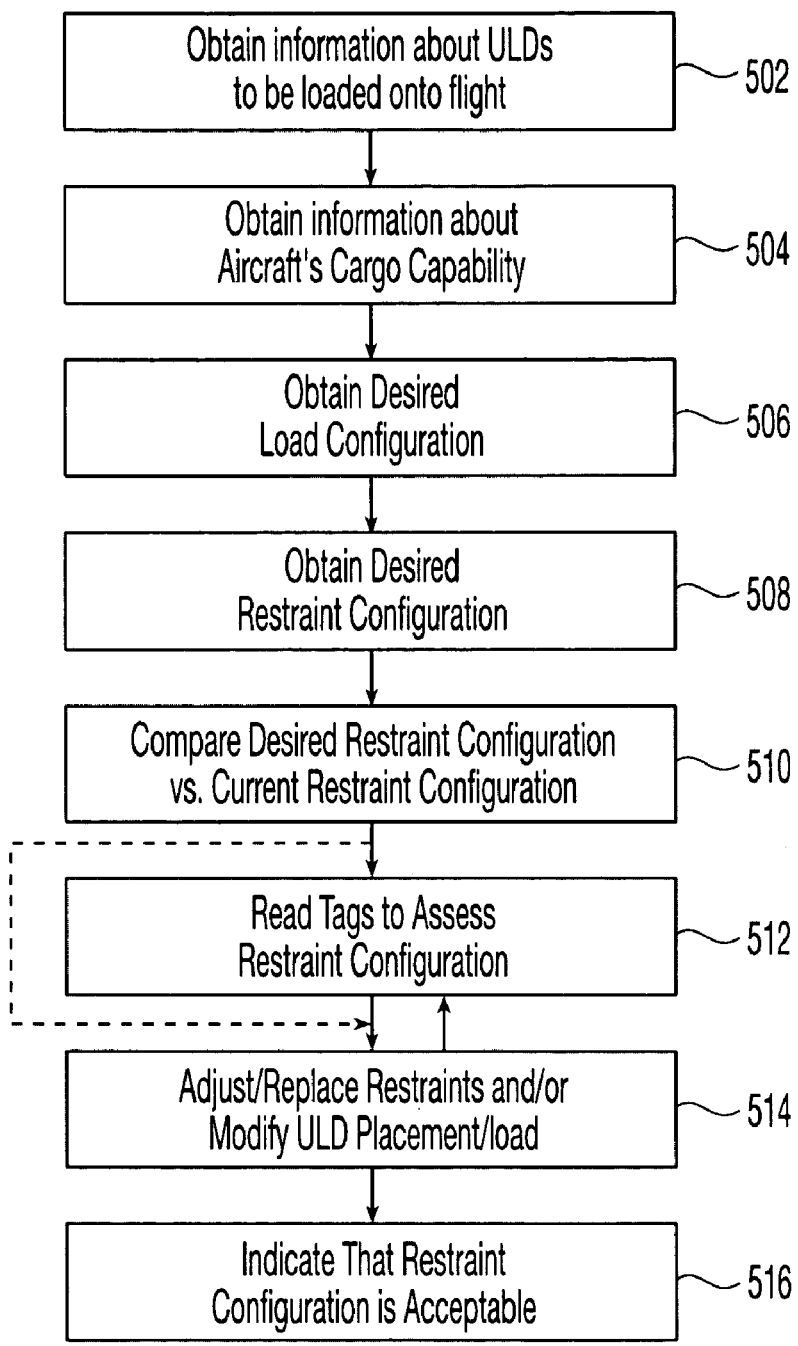
FIG. 5 shows the overall method of using a system in accordance with the present invention.

FIG. 5 presents a flowchart 500 representing a high-level view of a method to confirm the restraint configuration for an upcoming flight, in accordance with the present invention.

In step 502, ULD information, i.e., information about the ULDs to be loaded onto the aircraft, is obtained. This information includes at least the number and types of ULDs to be shipped, along with the gross weight of each. In step 504, information about the possible load configurations aboard the aircraft is obtained. This information provides a plurality of options for arranging ULDs in the one or more cargo compartments of the aircraft. This information is normally determined at the time the aircraft cargo area is first configured for delivery to the owner or operator of the aircraft; it may also be specified at some later time, if the aircraft is re-configured. It is further understood that the sequence of steps 502 and 504 is not important, and so may be reversed.

In step 506, a desired load configuration is determined, based on at least the ULD information and perhaps also the information about the possible load configurations. In step 508, the desired restraint configuration corresponding to the desired load configuration is determined, based on the requirements of each ULD and the positions in which those ULDs are to occupy. Thus, the desired restraint configuration details which restraints are needed at which install points, if the desired load configuration is to be implemented for the upcoming flight. In this manner, the desired restraint configuration effectively is a 'wish list' of what all restraints are needed and where they should be installed.

In step 510, the desired restraint configuration is checked against the information in the Aircraft Installed Restraint File 440 or, more specifically, information in a relational database corresponding to at least some of the entries depicted in the records of file 440. This is done to see whether the desired restraint configuration from step 508 is matched by the assumed current restraint configuration, based on information in the database for that aircraft. This comparison may be done automatically by computer, using appropriate software, or manually by comparing lists of restraint and location data and/or view graphical displays. The result from step 510 may be a determination that the desired restraint configuration is matched by the assumed current restraint configuration (e.g., as indicated by the information in the Aircraft Installed Restraint File 440). The result from step 510 may instead be that one or more of the desired restraint criteria are not met on the aircraft as it is assumed to be currently configured (again, as indicated by the information in the Aircraft Installed Restraint File 440), thereby producing a list of restraints presumed to be missing.

In either case, in step 512, one or more install tags and/or corresponding restraint tags may be read to determine the actual restraint configuration. The goal is to the determine whether the desired restraint configuration, and thus the desired load configuration, is possible. And if this is not possible, to determine an alternative restraint configuration that results in slight changes to the desired load configuration, yet preferably achieves the objective of shipping all the items scheduled to be sent on that flight. Any changes made to the locations of the installed restraints may also be registered so as to update the database.

If it has been determined that a restraint is missing or damaged in step 514, restraints may be moved from one install point where they are not needed for the upcoming flight to another where they are needed. Likewise, if spare restraints of the appropriate type are available, they may be installed for the first time in an install point to help satisfy the preferred restraint configuration. Whenever a restraint is moved or installed, the install point tag and the restraint tag are read, so as to register the pair and update the information in the database, and thus in the Aircraft Installed Restraint File 440.

If, for any reason, it is not possible to fully satisfy the desired restraint configuration, then in step 514, an alternative, slightly degraded alternative restraint configuration, such as one that corresponds to having one or more ULDs with a reduced maximum gross weight, will be selected. It is understood, as indicated by the double arrows, that steps 512 and 514 occur more or less concurrently with a change being made, more tags being read, another change being made, etc.

In an alternative embodiment, one may skip step 512 and go directly to step 514, as indicated by the dashed line. In such case, adjustments would be made based on the results of step 510.

In step 516, after either the desired or alternative restraint configuration is confirmed, a signal is sent to one or more of the load master computer 610, the onboard cargo computer 640 and/or other devices to indicate that the aircraft is ready to be loaded.

Figure 6:
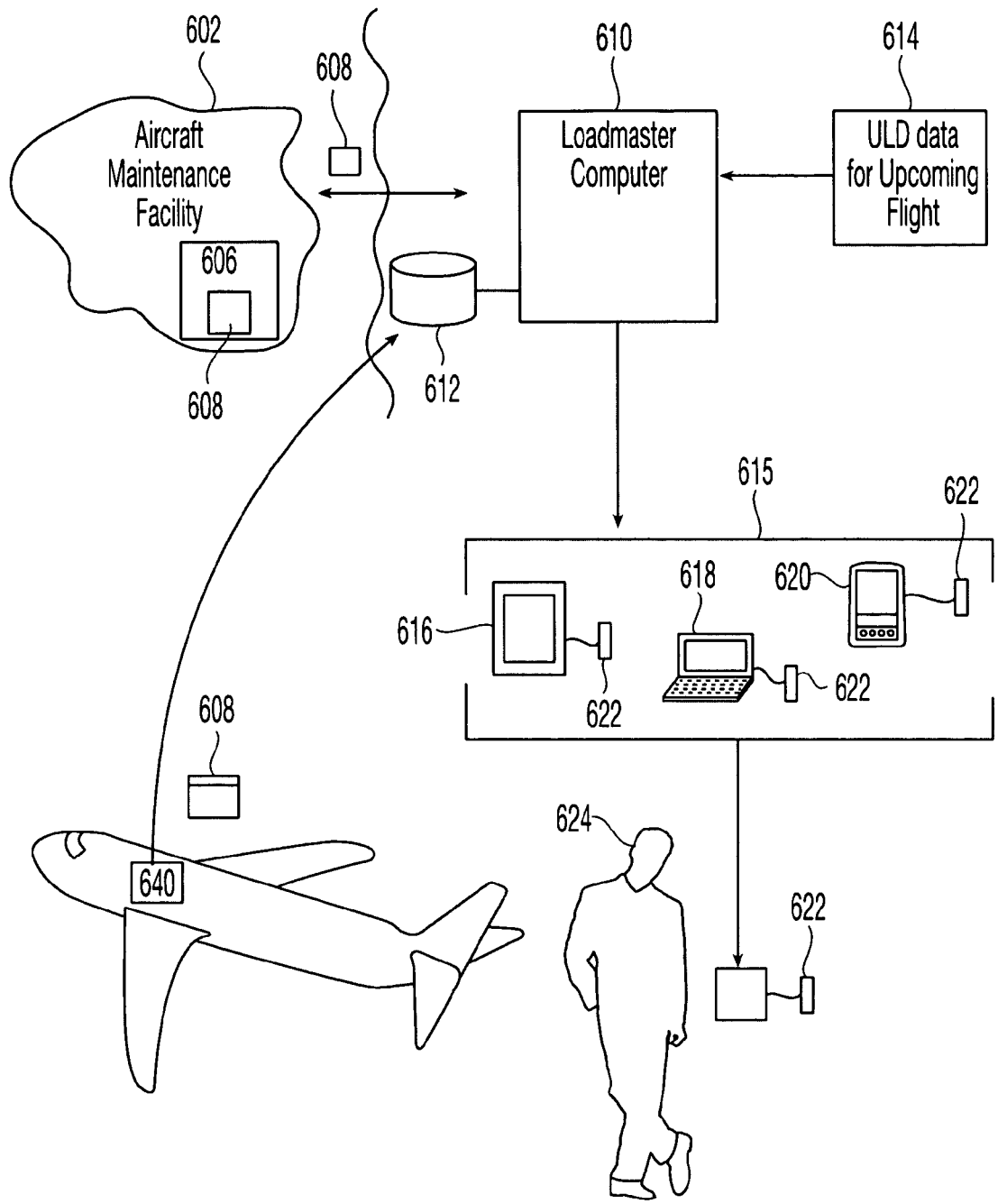
FIG. 6 shows various components of a system in accordance with the present invention.

FIG. 6 pictorially presents various entities and components that may play a role in the present invention.

Aircraft support facility 602 may be located in a different city, state or even country than the airport where the aircraft 604 is being loaded for an upcoming flight. In the present context, an aircraft support facility 602 may be where an aircraft cargo compartment, with its roller track, ball panels and other fixtures, is initially established. This is where the install point tags and restraints may be initially installed and, during the lifetime of the aircraft 604, major repairs are performed. It is understood that there may be more than one such facility worldwide to which aircraft 604 may go for such services, and all of these are condensed into the depicted facility 602 for purposes of the present discussion. One or more server computers 606 associated with facility 602 are charged with maintaining load/restraint configuration data 608 about any aircraft that uses facility 602, and providing the load/restraint configuration data 608 upon request. The load/restraint configuration data 608 may include the database containing the information presented in at least the Aircraft Install Point Tag File 4b and the Aircraft Installed Restraint File 4c, and also information about all load configurations possible with that particular aircraft. In general, this information is made available to any airport or other cargo loading facility visited by, or used by, aircraft 604. This allows loading crews and other personnel at those locations to obtain this information in advance of an aircraft's arrival, and plan for the loading of that aircraft.

It may instead be the case that the aircraft 604 itself has an onboard cargo computer 640 which stores that aircraft's own load/restraint configuration data. This data is then provided to the load master computer 610 upon the aircraft's arrival at the airport, either by wireless or wired communications link, or even by someone carrying a computer-readable memory storage device having stored thereon the load/restraint configuration data.

In either case, the load/restraint configuration data is received by a load master computer 610 located at the airport where the aircraft is to be loaded with cargo, and stored in an associated memory device 612. The load master computer 610 also receives ULD data 614 for the upcoming flight, such as the number and types of ULDs to be loaded onto aircraft 604 and the gross weight of each ULD.

The load master computer 610 then uses the ULD data and the load/restraint configuration data to determine a desired load configuration for the upcoming flight and, from that, a desired restraint configuration, using known techniques. The load master computer also compares the desired restraint configuration with the assumed current restraint configuration, the latter being included in the load/restraint configuration data. This comparison produces a 'missing restraint list', which preferably identifies by location and restraint type or model number, all restraints that are among those in the desired restraint configuration, but not in the assumed current restraint configuration. The desired load configuration, the desired restraint configuration, the missing restraint list and the load/restraint configuration data may then be downloaded to a portable device 615.

Preferably, the portable device 615 includes a processor and one or more memories for storing executable software instructions. The one or more memories also store information such as the desired load configuration for the upcoming flight, the desired restraint configuration, the load/restraint configuration data, the missing restraint list, and the like. The portable device further should include a communication interface such as a wireless network device for receiving and sending data to other computer systems, and also be configured to obtain information from a machine-readable identifier. In a preferred embodiment, the portable device may be a tablet-PC 616, a laptop computer 618, a personal digital assistant/cellphone 620 or the like, having a tag reader 622 of the sort used to read bar codes, interrogate and read RFID tags, or other such machine readable identifiers. The tag reader may be tethered to the portable device with communication conducted over wired link, or may be wirelessly connected to it.

A loading crew member 624 takes the portable device into the cargo compartment and uses it as a tool to inspect restraints, record problems such as damaged or missing restraints (e.g., 'false positives'—those wrongly entered in the Aircraft Installed Restraint File 4c), make adjustments, update the database as needed, and report back to the load master computer 610.

Figure 7:
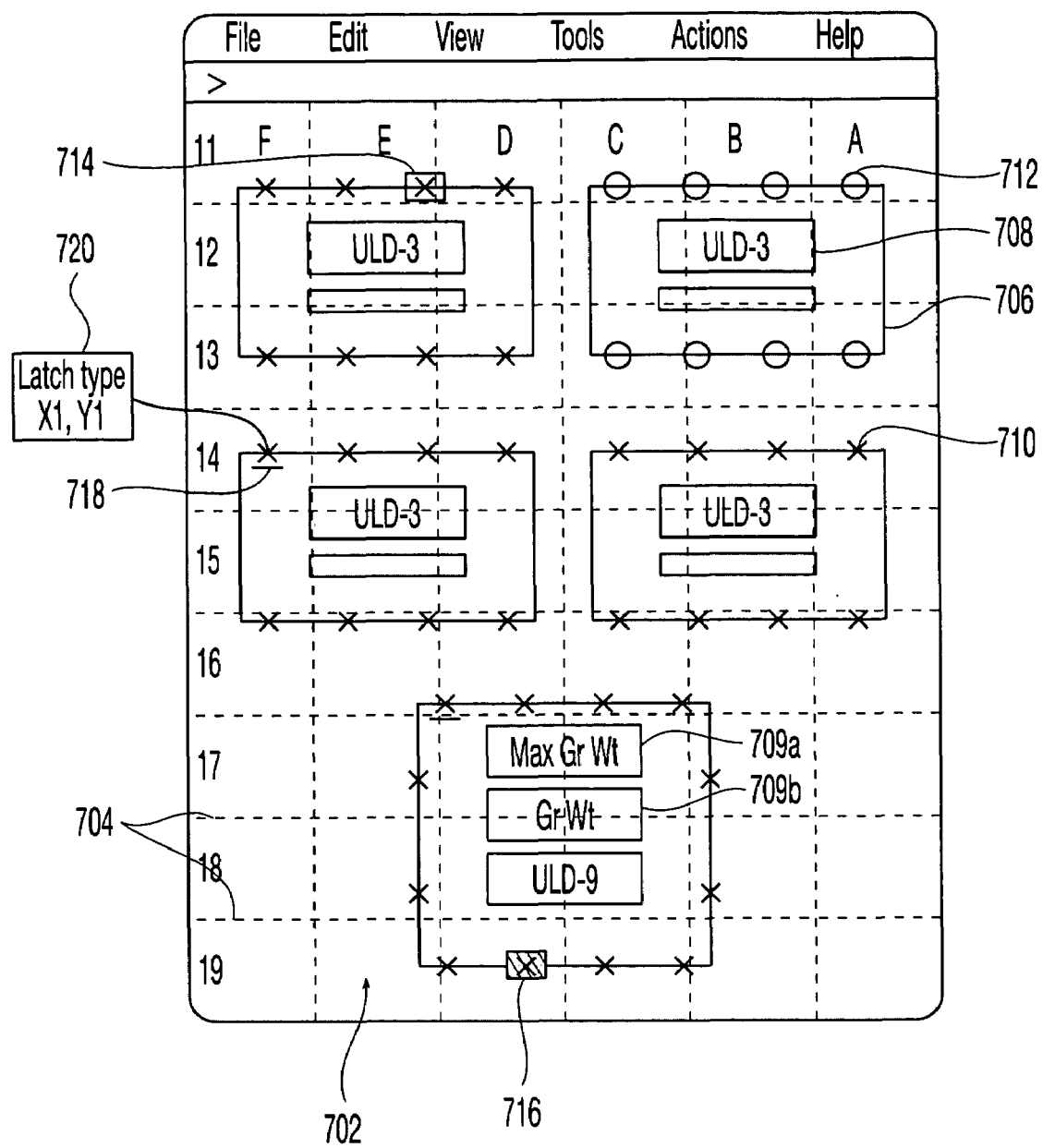
FIG. 7 depicts a display that may be used in accordance with the present invention.

While the information downloaded to the portable device may be displayed to the loading crew as text, it may be advantageous to present the information through a graphical user interface. FIG. 7 illustrates a preferred graphical display 700 of a portable device. The principal window 702 of the display 700 has a labeled grid 704 corresponding to the grid of the compartment being inspected. It is understood that only a portion of the compartment may be displayed at a given time, the user being allowed to "scroll" the window to display other portions of the cargo floor.

The display 700 presents the proposed layout of the ULDs 706 by providing the outline of each ULD. Within the ULD outline, the ULD type 708, the maximum gross weight 709a to be carried by that ULD, and the proposed gross weight 709b to be carried by that ULD may also be displayed.

The restraints required for each ULD are indicated by symbols or other indicia to signify different attributes. For example, the restraints in the embodiment shown are indicated either by an "X" 710 or an "O" 712, the former indicating that the loading crew member has yet to read the corresponding restraint's tag and the latter indicating that the corresponding restraint's tag has already been read. An enclosing box 714 may be used to designate a restraint on the missing restraint list while reverse video 716 may be used by the user, upon visual inspection, to designate a 'false positive' restraint. It is understood that other schemes, such as other symbols, colors and shading patterns, and combinations of these, among others, may be used to indicate different restraint attributes.

Furthermore, by moving a cursor 718 to a restraint symbol, information about the restraint can displayed in a window 720. This information may include such things as the type of restraint and/or its model number and the X, Y coordinates of that restraint, based on what the desired restraint configuration calls for.

The user checks each restraint in the desired restraint configuration, and indicates on the portable device whether that restraint is available, unavailability preferably being indicated by a yet another symbol. If a particular restraint is unavailable, load configuration software in the portable device determines a degraded maximum gross weight for the affected ULD, and displays this in box 709a on the display. The proposed gross weight displayed 709b may also be adjusted downward, with the number flashing to remind the user later on that that weight reduction must be added to another ULD or omitted from the shipment. A record of this reduction is noted in a data file to be shipped to the load master computer 610 and/or the onboard cargo computer 640.

In the foregoing discussion, the load master computer provided the desired load configuration for the upcoming flight, the desired restraint configuration, the load/restraint configuration data and the missing restraint list to the portable device 615. However, other scenarios are possible.

In one scenario, the load master computer 610 plays no role and the portable device 615 itself is the one that obtains the load/restraint configuration data 608 and the ULD data 614, and then determines the desired load and restraint configurations and the missing restraint list.

In another scenario, the load master computer 610 determines the desired load configuration and downloads this to the portable device 615. The portable device obtains the load/restraint configuration data, either from the load master computer, or other source, such as the aircraft maintenance facility 602. The portable device then determines the desired restraint configuration and the missing restraint list.

Figure 8A:
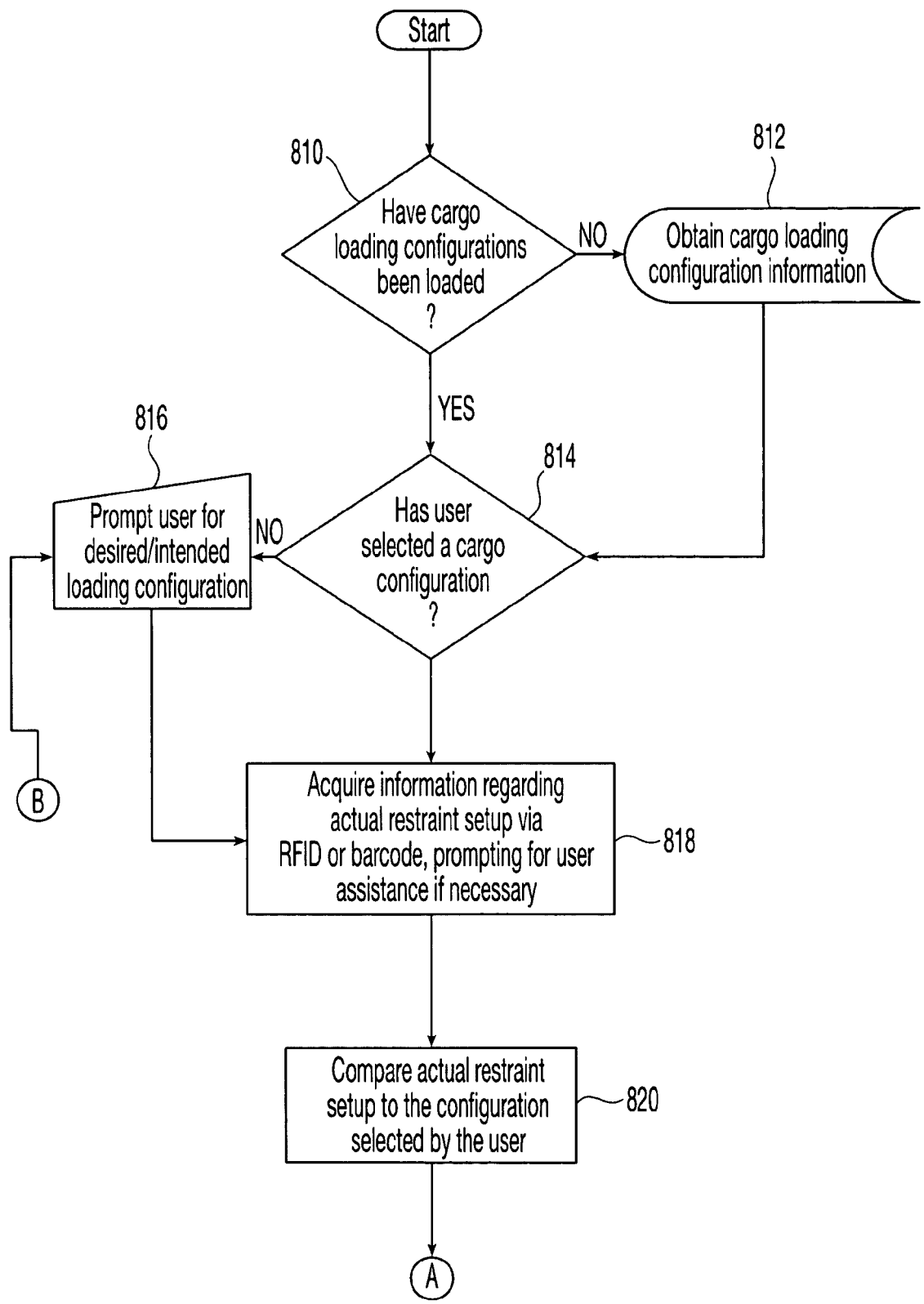
FIG. 8 is a flow diagram of the functionality performed by a portable device in accordance with an embodiment of the present invention.
Figure 8B:
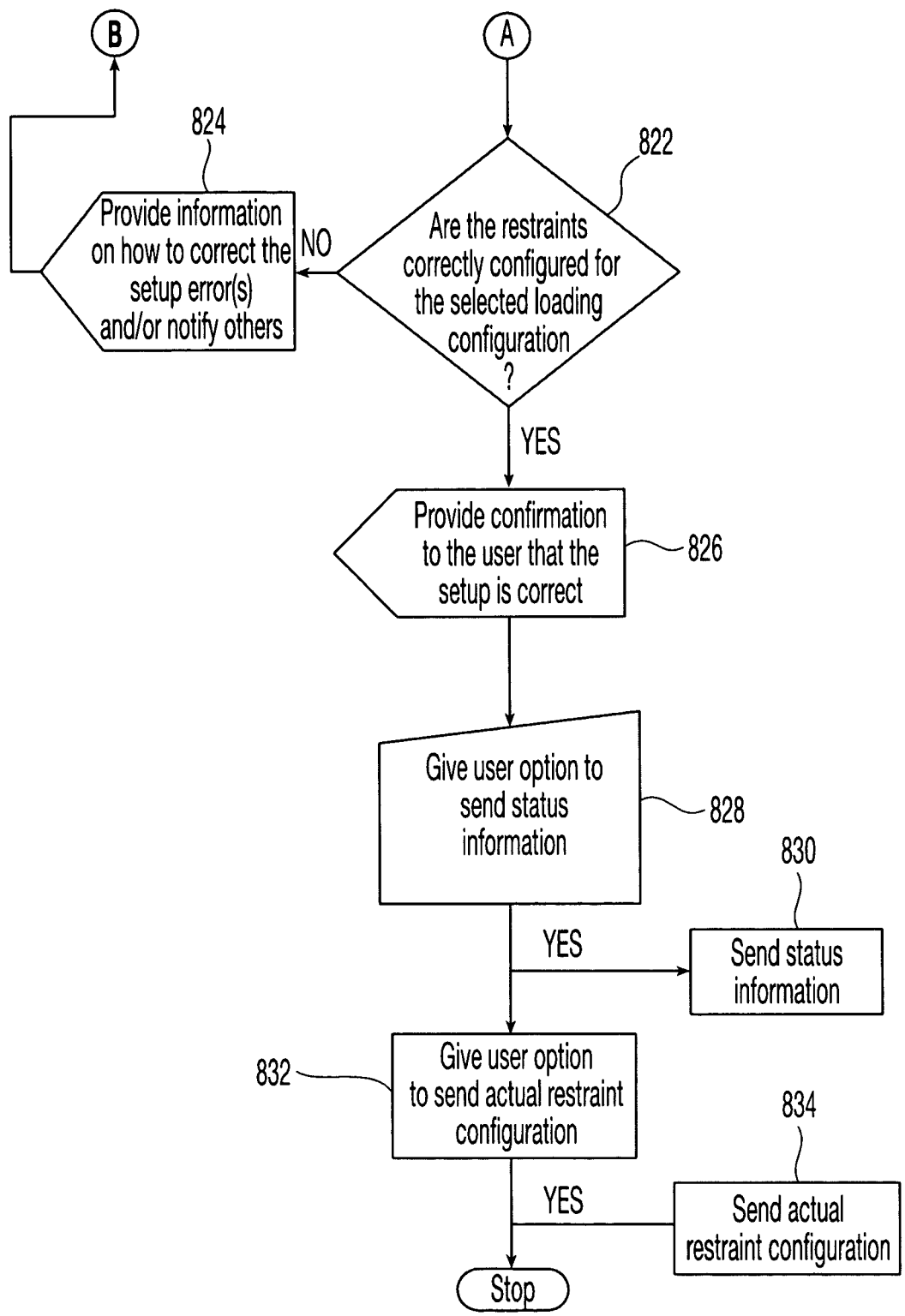

FIG. 8 is a flow diagram of the functionality performed by a portable device used to verify or otherwise ensure that an actual restraint configuration matches the required restraint configuration for one of a plurality of predetermined loading configurations. Preferably, the portable device has previously been loaded with the various possible loading configurations, along with software algorithms for determining when variations (i.e., slight adjustments of the ULD positions) within the baseline configuration for each of these may be allowed. Preferably, these predetermined loading configurations and variation algorithms are in accordance with the published aircraft load/restraint configuration documentation for that aircraft.

At decision point 810, it is determined if the various predetermined loading configurations (and thus the corresponding restraint configurations required for each) have been loaded into the portable device.

If the various predetermined loading configurations have not been loaded, in step 812, they are obtained via a wired or wireless network connection, or by reading from a CD or other physical computer-readable medium bearing such configurations. Preferably, the predetermined loading configurations are stored in non-volatile memory.

At decision point 814, it is determined if the user has selected one of the predetermined loading configurations to verify. A pull-down menu displaying no default configuration may be provided, with the user being required to select from among a list of configurations. If the user has not made a selection, at 816, the user is prompted to make a selection. At this point, it is assumed that all the restraints (or other Line Replaceable Units) required to satisfy the selected restraint configuration are installed on the cargo floor at the correct install points; the task is to make sure that this is indeed the case.

At step 818, the position of each install point and installed restraint is determined by reading the machine readable identifier on each install point and restraint. For this, the user moves through the entire compartment with reader device 622 to query all of the install points and restraints. Software in the portable device may prompt the user to first read the install point and then read the restraint, thereby establishing the correlation between the two. The user may also be given an opportunity to indicate if a particular restraint is broken or missing. From reading the identifiers on each install point and restraint, the actual restraint configuration of the aircraft is determined.

At step 820, the thus acquired actual restraint configuration is compared to the selected restraint configuration. It is understood that this can be done incrementally as the user moves through the compartment and reads each install point/restraint pair, or after all the install point/restraint pairs have been read.

At decision point 822, based on this comparison, it is determined whether the actual restraint configuration includes all the restraints required to satisfy the selected restraint configuration, it being understood that "extra" restraints not required to satisfy the selected restraint configuration may also be present are were read during the inspection process.

If all the restraints required to satisfy the selected restraint configuration are not present, then at step 824 the user is notified which restraints are missing. The user may also be presented with suggestions and options to deal with the missing or broken restraints. One type of suggestion may be to identify "extra" restraints that may be moved from one install point where they are not needed for the selected restraint configuration to another install point where they are needed. Another type of suggestion may be to indicate optional loading configurations in the degraded area.

The user may also be given the option to send some or all of the information about missing or broken restraints and the various suggestions to another computer so as to notify others who may then take corrective action.

The corrective action typically entails modifying the actual restraint configuration based on the results of comparing the selected restraint configuration with the actual restraint configuration. Such modification may result in the actual restraint configuration satisfying the selected restraint configuration, satisfaction being achieved by either having the actual restraint configuration exactly match the selected restraint configuration, or by ensuring that the actual restraint configuration has all the restraints called for by the selected restraint configuration, plus others.

If all the restraints required to satisfy the selected restraint configuration are present, then at step 826, the user is provided with a confirmation of this, such as by a visual signal and/or an audible signal on the portable device.

At step 828, the user is prompted to send status information to other platform(s). The status information may include such things as confirmation that a particular loading configuration has been verified. The other platform(s) may include the load master computer 610 and the onboard computer 640, and perhaps other computers, as well. If the user elects to do so, the status information is sent 830.

At step 832, the user is given the option to send the actual restraint configuration information to other platform(s). The other platform(s) may include the load master computer 610, the onboard computer 640, and perhaps other computers, as well, including those tasked with maintaining current restraint information back at the aircraft maintenance facility 602. If the user elects to do so, the actual restraint configuration is sent 834.

The various 'send' operations from the portable device may be done wirelessly, such as while the user operating the portable device is still aboard the aircraft. Alternatively, one of more of the send operations may be done using wired, serial or parallel data links either by connecting the portable device to the platform(s) or to a network.

As disclosed, embodiments of the present invention allow any user to correctly configure an aircraft, regardless of skill, system knowledge, or training. In addition, embodiments of the present invention can interface with external systems for downloading configuration information. This may assist not only in preparing for the next flight, but also in preparing for maintenance such as when a restraint is found damaged or missing and a replacement is unavailable at the current stop, but may be made available at the next stop.

The present invention has been described with respect to specific embodiments. However, it will be appreciated that modifications and variations of the present invention are covered by the above teachings and within the purview of the appended claims without departing from the spirit and intended scope of the invention.

What is claimed is:

1. A method of verifying cargo restraints installed on an aircraft in preparation for loading said aircraft, the method comprising:
    obtaining a desired restraint configuration;
    determining an actual restraint configuration on the aircraft by receiving first data from a first plurality of machine readable identifiers corresponding to a plurality of install points and by receiving second data from a second plurality of machine readable identifiers corresponding to a plurality of restraints; and
    comparing the desired restraint configuration with the actual restraint configuration.

2. The method of claim 1, further comprising modifying the actual restraint configuration, based on results of comparing the desired restraint configuration with the actual restraint configuration.

3. The method of claim 1, further comprising modifying the actual restraint configuration to satisfy the desired restraint configuration.

4. The method of claim 3, further comprising modifying the actual restraint configuration to exactly match the desired restraint configuration.

5. The method of claim 1, wherein the first plurality of machine readable identifiers and the second plurality of machine readable identifiers are bar codes.

6. The method of claim 1, wherein the first plurality of machine readable identifiers and the second plurality of machine readable identifiers are radio frequency identification tags.

7. The method of claim 1, further comprising:
    sending the actual restraint configuration to another computer.

8. The method of claim 1, wherein the first data and the second data identify a plurality of install point and restraint pairs.

9. An aircraft cargo loading logistics system comprising:
    a computer system; and
    a reading device coupled to said computer system to receive identifier information from a plurality of machine readable identifiers coupled to install points and restraints;
    wherein the computer system is configured to receive a desired restraint configuration, determine an actual restraint configuration from the identifier information, and compare the desired restraint configuration with the actual restraint configuration.

10. The system of claim 9, wherein the plurality of machine readable identifiers are bar codes.

11. The system of claim 9, wherein the plurality of machine readable identifiers are radio frequency identification tags.

12. The system of claim 9, wherein the computer system is further configured to notify another device, if the desired restraint configuration matches the actual restraint configuration.

13. The system of claim 9, wherein the computer system is further configured to notify another device, if the desired restraint configuration does not match the actual restraint configuration.

14. The system of claim 9, wherein the computer system is configured to send the actual restraint configuration to another computer.

15. The system of claim 9, wherein the plurality of machine readable identifiers identify a plurality of install point and restraint pairs.

16. A computer readable medium having executable software code stored thereon, that, when executed, causes a computer to:
   receive a desired restraint configuration of an aircraft;
   determine an actual restraint configuration on the aircraft by receiving first data from a first plurality of machine readable identifiers corresponding to a plurality of install points and by receiving second data from a second plurality of machine readable identifiers corresponding to a plurality of restraints;
   compare the desired restraint configuration with the actual restraint configuration; and
   determine if the aircraft was properly configured based on the comparison.

17. The computer readable medium of claim 16, wherein the first plurality of machine readable identifiers and the second plurality of machine readable identifiers are bar codes.

18. The computer readable medium of claim 16, wherein the first plurality of machine readable identifiers and the second plurality of machine readable identifiers are radio frequency identification tags.

19. The computer readable medium of claim 16, wherein said instructions further cause the computer to send the actual restraint configuration to a second computer.

20. The computer readable medium of claim 19, wherein the first data and the second data identify a plurality of install point and restraint pairs.

21. A cargo loading logistics system for verifying a restraint configuration on an aircraft, said system comprising:
   means for receiving a desired restraint configuration;
   means for determining an actual restraint configuration on the aircraft by receiving first data from a first plurality of machine readable identifiers corresponding to a plurality of install points and by receiving second data from a second plurality of machine readable identifiers corresponding to a plurality of restraints; and
   means for comparing the desired restraint configuration with the actual restraint configuration.

* * * * *

UNITED STATES PATENT AND TRADEMARK OFFICE
CERTIFICATE OF CORRECTION

PATENT NO. : 7,003,374 B2  Page 1 of 1
DATED : February 21, 2006
INVENTOR(S) : Craig J. Olin et al.

It is certified that error appears in the above-identified patent and that said Letters Patent is hereby corrected as shown below:

<u>Column 14,</u>
Lines 21-28, should read as follows:

-- 22. An aircraft cargo hold equipped with machine readable identifiers coupled to restraints in said cargo hold, in combination with a computer system configured to:
   receive a desired restraint configuration;
   determine an actual restraint configuration based on information received from said machine readable identifiers; and
   compare the desired restraint configuration with the actual restraint configuration. --.

Signed and Sealed this

Thirtieth Day of May, 2006

JON W. DUDAS
*Director of the United States Patent and Trademark Office*